(12) United States Patent
Ficker et al.

(10) Patent No.: US 8,161,620 B2
(45) Date of Patent: Apr. 24, 2012

(54) ANNULAR COMPOSITE WORKPIECES AND A COLD-ROLLING METHOD FOR PRODUCING SAID WORKPIECES

(75) Inventors: Thomas Ficker, Raschau (DE); Andrá Hardtmann, Dresden (DE); Mario Houska, Sebnitz (DE); Volker Thoms, Rabenau (DE)

(73) Assignee: Technische Universität Dresden, Dresden (DE)

( * ) Notice: Subject to any disclaimer, the term of this patent is extended or adjusted under 35 U.S.C. 154(b) by 1531 days.

(21) Appl. No.: 10/563,969

(22) PCT Filed: Jul. 8, 2004

(86) PCT No.: PCT/DE2004/001539
§ 371 (c)(1),
(2), (4) Date: Mar. 1, 2006

(87) PCT Pub. No.: WO2005/005079
PCT Pub. Date: Jan. 20, 2005

(65) Prior Publication Data
US 2006/0196033 A1    Sep. 7, 2006

(30) Foreign Application Priority Data
Jul. 9, 2003  (DE) .................................. 103 31 061

(51) Int. Cl.
*B21D 39/00* (2006.01)
*B29D 33/00* (2010.01)

(52) U.S. Cl. ......... 29/508; 29/505; 29/516; 29/898.058; 29/898.059; 29/898.066; 72/107; 72/110

(58) Field of Classification Search ............... 29/505, 29/506, 507, 515, 516, 898.054, 898.057, 29/898.059, 898.066, 508, 898.058; 72/84, 72/85, 105, 107, 110; 384/912
See application file for complete search history.

(56) References Cited

U.S. PATENT DOCUMENTS

| | | | | |
|---|---|---|---|---|
| 831,887 A | * | 9/1906 | Nicholson | 228/131 |
| 1,329,479 A | * | 2/1920 | Savon | 285/382.2 |
| 1,396,918 A | * | 11/1921 | Brace | 29/424 |
| 1,892,178 A | * | 12/1932 | Stockfleth | 29/898.058 |
| 2,073,909 A | * | 3/1937 | Stecher | 29/508 |
| 2,107,943 A | * | 2/1938 | Hopkins | 219/73.21 |
| 2,305,794 A | * | 12/1942 | Roeckner | 72/73 |
| 2,377,681 A | * | 6/1945 | Etchells | 29/898.058 |
| 2,741,498 A | * | 4/1956 | Elliott | 285/148.11 |
| 3,009,484 A | * | 11/1961 | Dollens | 138/140 |
| 3,068,563 A | * | 12/1962 | Reverman | 29/458 |
| 3,125,493 A | * | 3/1964 | D'Amore | 376/420 |
| 3,149,513 A | * | 9/1964 | Dollens | 29/516 |

(Continued)

FOREIGN PATENT DOCUMENTS
DE          200 923          8/1908
(Continued)

*Primary Examiner* — Essama Omgba
(74) *Attorney, Agent, or Firm* — Gudrun E. Huckett

(57) ABSTRACT

In a cold rolling method for producing annular composite workpieces, at least two hollow cylindrical workpieces made of different materials are inserted into one another. The at least two hollow cylindrical workpieces are roll formed by pressing the at least two hollow cylindrical workpieces against each other between two diametrically opposed external roll forming tools and an internal rolling arbor or between two diametrically opposed external roll forming tools and an internal roll forming tool to form a composite workpiece. The composite workpiece is a bearing ring or a gear ring. One of the hollow cylindrical workpieces can be a nonferrous material such as aluminum.

16 Claims, 4 Drawing Sheets

U.S. PATENT DOCUMENTS

| | | | | |
|---|---|---|---|---|
| 3,409,973 | A * | 11/1968 | Kilp et al. | 419/3 |
| 3,509,617 | A * | 5/1970 | Winter | 228/115 |
| 3,528,271 | A | 9/1970 | Di Ponio | 72/108 |
| 3,626,564 | A * | 12/1971 | Daniel | 29/898.066 |
| 3,803,890 | A | 4/1974 | Connell | 72/107 |
| 3,834,003 | A * | 9/1974 | Nayar | 419/8 |
| 3,859,831 | A * | 1/1975 | Timmermans | 72/68 |
| 3,982,904 | A * | 9/1976 | Nayar | 428/547 |
| 4,114,414 | A * | 9/1978 | Goodman | 72/105 |
| 4,189,816 | A | 2/1980 | Chalansonnet | 29/148.4 |
| 4,612,789 | A * | 9/1986 | Andriessen | 72/71 |
| 4,756,465 | A * | 7/1988 | Pranch et al. | 228/115 |
| 4,766,752 | A * | 8/1988 | Gronert et al. | 72/84 |
| 4,774,749 | A * | 10/1988 | Furumura | 29/898.055 |
| 4,790,471 | A * | 12/1988 | Turner | 228/131 |
| 4,795,078 | A * | 1/1989 | Kuroki et al. | 228/131 |
| 4,881,679 | A * | 11/1989 | Turner | 228/132 |
| 5,544,955 | A * | 8/1996 | Wakefield | 384/295 |
| 5,716,413 | A * | 2/1998 | Walter et al. | 424/423 |
| 5,775,740 | A * | 7/1998 | Fukaya et al. | 285/256 |
| 5,988,484 | A * | 11/1999 | Osborn et al. | 228/126 |
| 6,276,181 | B1 * | 8/2001 | Kusakabe | 72/224 |
| 6,601,284 | B1 * | 8/2003 | Wall | 29/527.5 |
| 6,629,547 | B1 * | 10/2003 | Yamaguchi et al. | 138/129 |
| 6,904,680 | B2 * | 6/2005 | Fidziukiewicz | 29/898.059 |
| 7,316,142 | B2 * | 1/2008 | Lancaster | 72/82 |
| 7,337,519 | B2 * | 3/2008 | Parker | 29/505 |
| 7,774,916 | B2 * | 8/2010 | Jee et al. | 29/447 |
| 2005/0005983 | A1 * | 1/2005 | Lewis | 138/41 |
| 2005/0006899 | A1 * | 1/2005 | Lewis | 285/370 |
| 2006/0236545 | A1 * | 10/2006 | Ficker et al. | 29/898.066 |

FOREIGN PATENT DOCUMENTS

| | | |
|---|---|---|
| DE | 225 358 | 7/1985 |
| DE | 19526900 | 1/1997 |
| EP | 695598 A1 * | 2/1996 |
| EP | 1302274 | 4/2003 |
| GB | 2232726 | 12/1990 |
| JP | 58163821 | 9/1983 |
| JP | 01254329 A * | 10/1989 |
| JP | 03264175 A * | 11/1991 |
| JP | 11333514 A * | 12/1999 |
| JP | 11342419 A * | 12/1999 |
| JP | 2001200854 | 7/2001 |
| JP | 2006346726 A * | 12/2006 |

* cited by examiner

ANNULAR COMPOSITE WORKPIECES AND A COLD-ROLLING METHOD FOR PRODUCING SAID WORKPIECES

BACKGROUND OF THE INVENTION

The invention relates to annular composite workpieces, in particular rolling bearing rings, and a cold rolling method for the manufacturing thereof from at least two hollow cylindrical workpieces made of different materials or the same materials with different strength (in the following different materials).

Occasionally the production of this kind of rolling bearing rings is described in the literature.

According to DE 200 923, an unhardened reinforcement ring is placed over a hardened ring after it has been finish—machined and filled with balls. It is pointed out that the bearing can accept more balls because the hardened ring deforms elastically when filled. A bonded material structure and thus sufficient dynamic loadability cannot be reached with this solution.

In DE 27 45 527, the production of outer rings of rolling bearings by using cold rolling is described. Two rings with exactly the same volume made of different materials are fixedly connected to one another by skrinking, then roll formed, and afterwards finish—machined by turning and grinding. The advantages are above all seen in the combination of the material characteristics, here above all in the combination of a ball race of great hardness with excellent wear characteristics and a support ring of reduced hardness and strength that can then be processed more easily. During forming, the rings are deformed together tangentially, radially and axially at the same time. A fast connection of both rings is reached only in exceptional cases. Different materials generally have different expansion capacities so that the rings tend to separate (the shrink connection separates) rather than to remain fixed together. For the technical implementation of the method, a complex tool configuration made of several divided tool parts is necessary. The costs are high; the production spectrum is limited and greatly curtailed in regard to complicated profile cross sections. In spite of the obvious advantages resulting from the potentially higher practical value of the composite rolling bearings, no large scale application of DE 27 45 527 is known.

The object of the invention is to efficiently produce annular composite workpieces, especially for high dynamic loads, made of at least two hollow cylindrical workpieces.

SUMMARY OF THE INVENTION

According to the invention, the object is solved for a method with the features of the aforementioned kind in that the hollow cylindrical workpieces are formed to a composite workpiece by means of a generally known axial roll forming method. The hollow cylindrical workpieces are preferably inserted loosely into each other before rolling. The hollow cylindrical workpieces have such a play relative to one another that they can barely be joined by hand. Rings as the hollow cylindrical workpieces are inserted into each other and are formed to a composite workpiece by an axial ring roll forming method. Alternatively, pipes as hollow cylindrical workpieces are inserted into each other and formed by an axial pipe roll forming method to a composite workpiece. At least one of the surfaces touching one another of the hollow cylindrical workpieces is coated with a material, e.g. aluminum.

Furthermore, the object is solved by an annular composite workpiece comprised of at least two hollow cylindrical workpieces made of different materials, wherein the composite workpiece is produced by an axial roll forming method. The composite workpiece is preferably a bearing ring. The bearing race of the bearing ring is made of antifriction bearing steel and the support ring is made of a steel of reduced high quality. The composite workpiece can also be a gear ring. One of the workpieces can be comprised of a nonferrous metal, in particular aluminum. One of the workpieces can be made of plastic material. One of the workpieces can also be made of powder material.

Axial roll forming methods are known since 1972 at the latest. "When rolling, the material that is compressed by the penetration of the profile transversely to the axial direction of the workpiece is displaced laterally so far outwardly that across the original width of the workpiece . . . protruding lateral boundary edges are formed." (DE 22 08 515 A1, page 2)

It was found that the at least two workpieces are fixedly connected to each other even when they had been placed only loosely into each other beforehand and had not been shrunk. The composite shows characteristics of a cold pressure welding connection; these characteristics are the result of pressing together the surfaces of the workpieces at very high pressure.

The workpieces preferably have such a play relative to one another that they can barely be joined by hand.

Since such a play is permissible, pipes, i.e. longer hollow cylindrical workpieces, can also be fit together in an uncomplicated manner.

Therefore, both the axial roll forming of rings (e.g. DE 22 08 515 A1) as well as the axial roll forming of pipes (e.g. DD 225 358 or DE 195 26 900) can be employed. With the latter method, the composite rings are produced especially efficiently and in a material saving way.

Both profiled outer and inner rolling bearing rings can be produced. The bearing races are made of high quality antifriction bearing steel, respectively. The support rings in contrast are made of a steel which is not as strong, which is cheaper and can be machined more easily, so that the overall costs for the rolling bearing ring is clearly lowered.

Also, composite rings made of steel in combination with nonferrous metals, in particular aluminum, can be produced, for example, in lightweight construction or for corrosion protection. Because the material selection is matched to the function, production costs are saved to a considerable extent and new use characteristics are obtained.

BRIEF DESCRIPTION OF THE DRAWINGS

The invention is explained in more detail in the following with the aid of several embodiments based on the axial roll forming of pipes.

The drawings show in.

DESCRIPTION OF PREFERRED EMBODIMENTS

Figure 1:
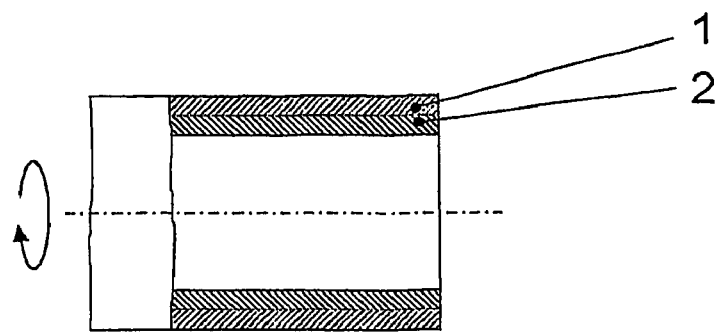
FIG. 1 the preparation of the pipes to be rolled.

According to FIG. 1, two pipes 1 and 2 are prepared for forming. They are, if necessary, turned on the outside and turned on the inside and then inserted into one another.

Figure 2:
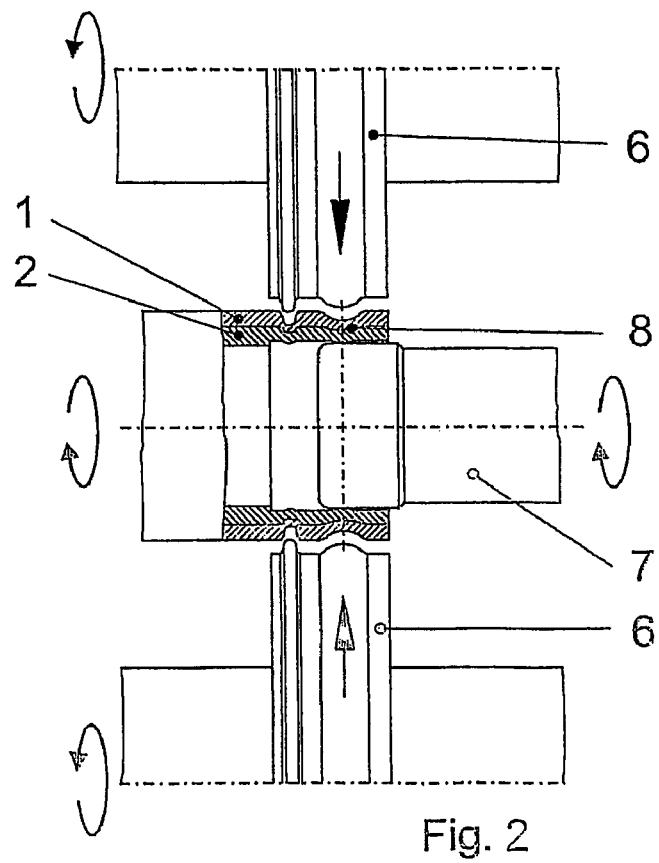
FIG. 2 the production of inner rings of rolling bearings from two pipes.

In FIG. 2, the two pipes 1 and 2 are positioned on a rolling arbor 7 between two roll forming tools 6 for forming an outer profile. The profiled rolling tools 6 are diametrically opposed, are rotatable, and can be radially advanced. In addition, they are axially movable in order to follow the pipe elongations caused by axial material flow.

Figure 3:
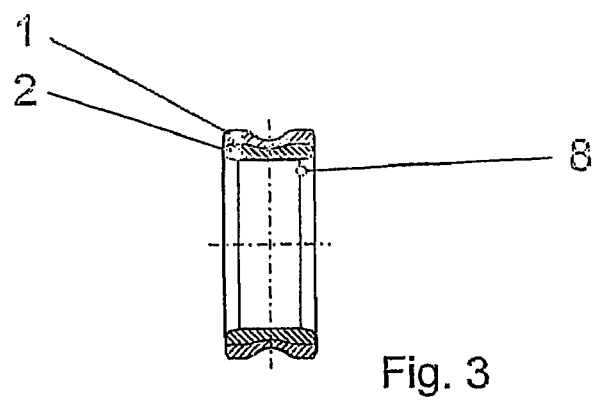
FIG. 3 an individual inner ring of rolling bearings made from two pipes.

FIG. 3 shows the composite inner ring 8 of a rolling bearing completely ready for grinding after the steps of cropping and machining by cutting. The original pipes 1 and 2 now form the bearing race 1', e.g. made of high-strength antifriction bearing steel, and the thrust ring 2' made of a steel which is not as strong and easier to machine.

Figure 4:
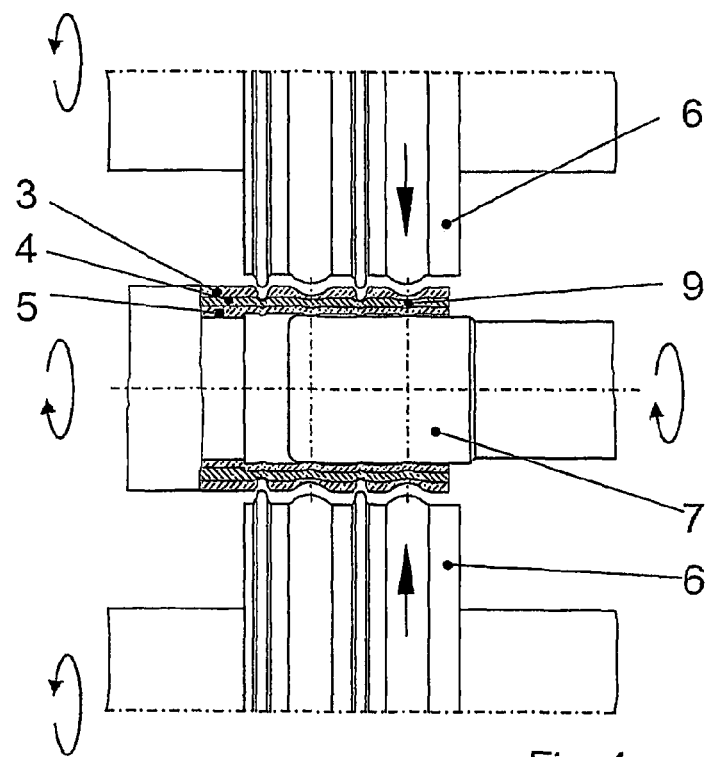
FIG. 4 the production of inner rings of rolling bearings from three pipes.

FIG. 4 shows the production of a composite inner ring 9 of a rolling bearing made of three workpieces 3, 4 and 5. The workpieces 3 and 5, formed as pipes, consist of different steels in analogy to the first variant; workpiece 4 is made of aluminum. It can intentionally be kept thick (lightweight construction) or can be only a thin, e.g. vapo deposited, layer in order to promote the connection of the workpieces 3 and 5 during rolling of the composite in analogy to cold pressure welding.

Figure 5:
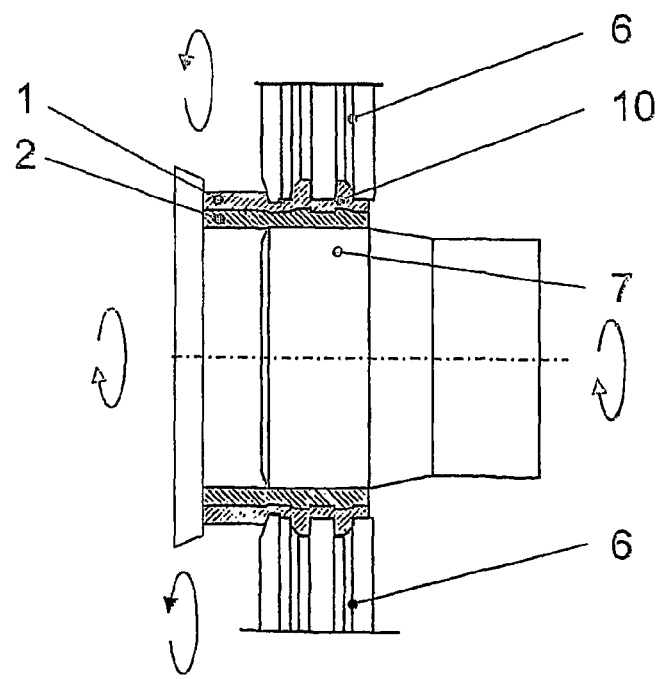
FIG. 5 the production of a gear ring from two hollow cylindrical workpieces, FIG. 6 the production of outer rings of rolling bearings from two pipes, FIGS. 7 and 8 section and side view, respectively, of a tangential rolling method for a ring, FIGS. 9 and 10 section and side view, respectively, of an axial rolling method for a ring.

FIG. 5 shows the production of a gear ring 10 from two pipes 1 and 2 with two roll forming tools 6 for forming an outer profile and a rolling arbor 7. The workpieces 1 and 2 are made of steel materials of different strength.

Figure 6:
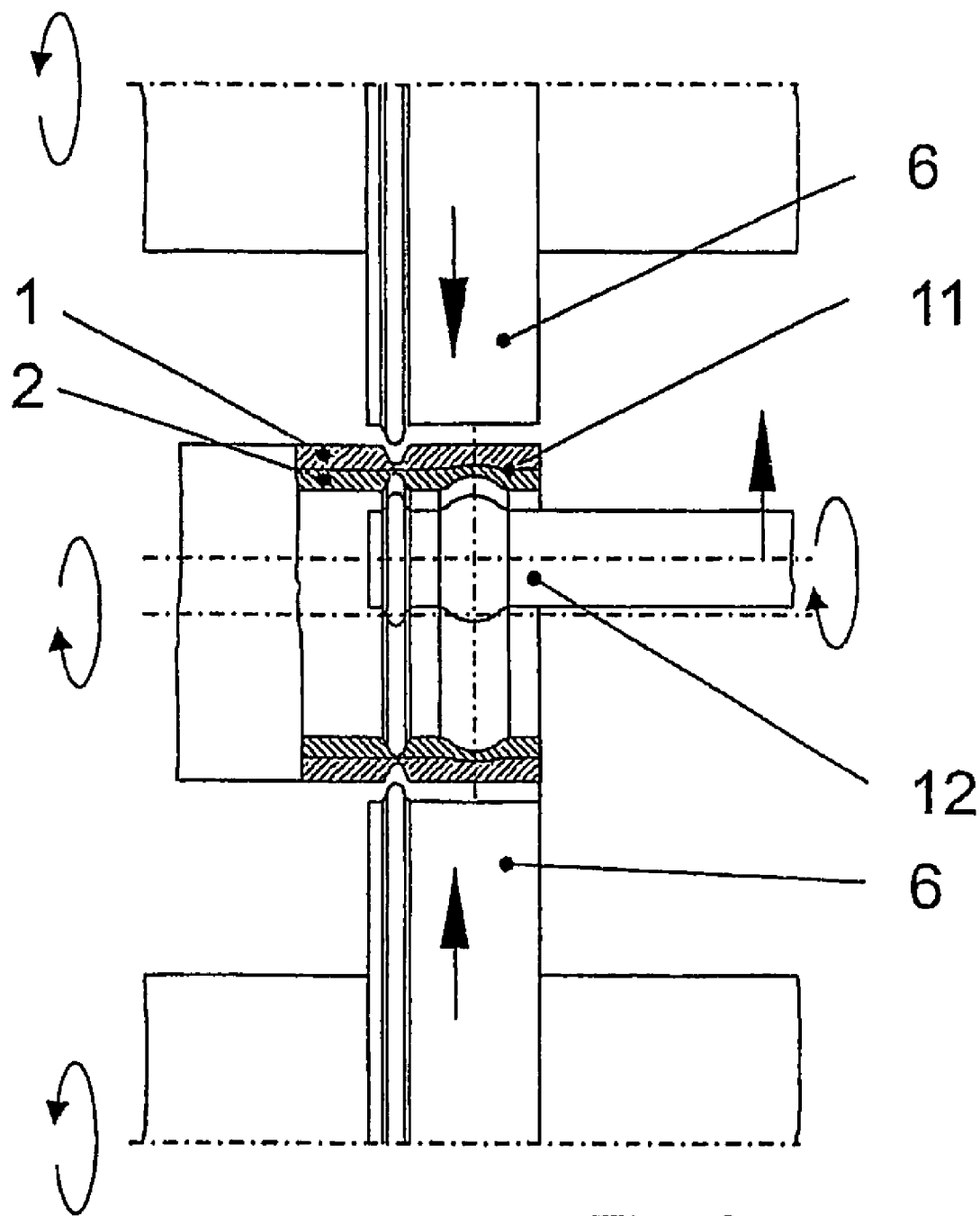

FIG. 6 shows the production of a composite outer ring 11 of a rolling bearing by means of an inner roll forming tool 12 and two outer roll forming tools 6. The high-strength pipe 1 forms again the bearing race and is now located on the inside in comparison to FIG. 2 or FIG. 3.

In all variants, it is ensured that the material, above all in the area of the bordering layers, can flow freely axially almost during the entire forming process.

In order to prevent possible misunderstandings in regard to the term of axial roll forming of rings or pipes, the definitions of tangential and of axial roll forming of rings used in the instant description are compared and explained with the aid of the FIGS. 7 to 8 and 9 to 10, respectively.

Figure 7:
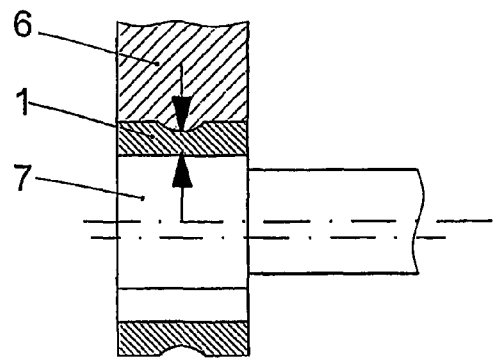
Figure 8:
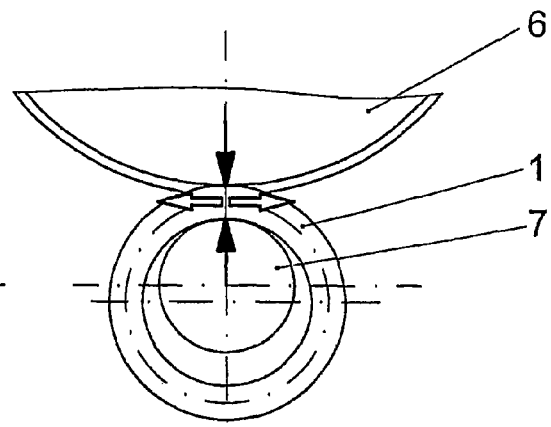

FIG. 7 and FIG. 8 show in section and in side view, respectively, the tangential roll forming of a workpiece 1 between a profiled roll forming tool 6 and a rolling arbor 7. The arrows shown with solid black tips (in a longitudinal direction of the page) show the pressure of the tools 6 and 7 on the workpiece 1. The pressure acts radially. The arrows with the blank tips (in a transverse direction of the page) show the primary direction of the material flow. The material flow is tangential in respect to the surface line or the circular center core of the workpiece 1 illustrated in FIG. 8. Characteristic for the tangential roll forming is the enlargement of the workpiece diameter. In addition, the shoulder height of the workpiece 1 decreases.

Figure 9:
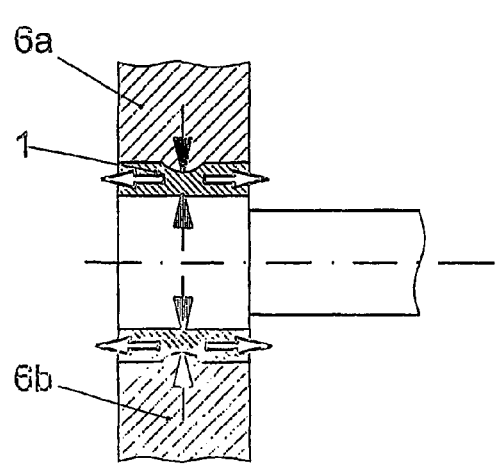
Figure 10:
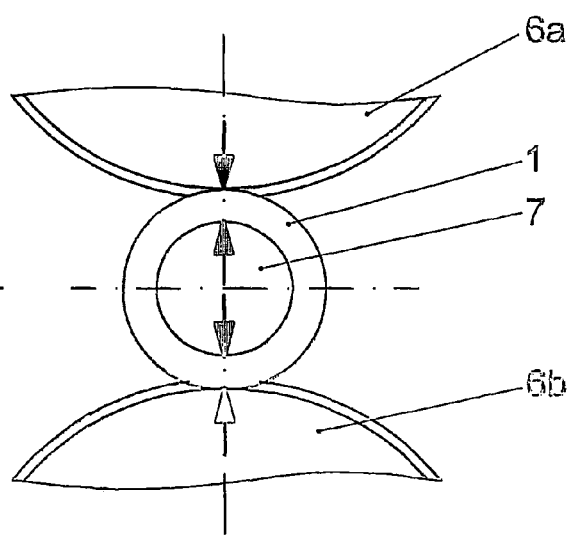

FIG. 9 and FIG. 10 show in section and side view, respectively, the axial roll forming of a workpiece 1 between two diametrically opposed roll forming tools 6a and 6b and a rolling arbor 7. The tools 6a, 6b and 7 press radially against the workpiece 1. The material flows predominantly axially. Characteristic for the axial roll forming process is the enlargement of the width of the workpiece. The width increases at least by the amount that corresponds to the volume of the rolled-in groove.

List of Reference Numerals
1—workpiece
1'—bearing race
2—workpiece
2'—support ring
3—workpiece
4—workpiece
5—workpiece
6, 6a, 6b—roll-forming tool for forming outer profile
7—rolling arbor
8—composite inner ring of rolling bearing
9—composite inner ring of rolling bearing
10—gear ring
11—composite outer ring of rolling bearing
12—roll-forming tool for forming inner profile

What is claimed is:

1. A cold rolling method for producing an annular composite workpiece, the method comprising the steps of:
    inserting a first hollow cylindrical workpiece into a second hollow cylindrical workpiece, wherein the first and second hollow cylindrical workpieces have radial play relative to one another when inserted into one another and are made of different materials;
    axial roll forming a composite workpiece of the first and second hollow cylindrical workpieces by pressing the first and second hollow cylindrical workpieces against each other between two diametrically opposed rotating outer roll forming tools and a rotating inner rolling arbor or between two diametrically opposed rotating outer roll forming tools and a rotating inner roll forming tool, wherein the two diametrically opposed outer roll forming tools are profiled to produce an outer profile on the composite workpiece, wherein the two diametrically opposed outer roll forming tools are radially advanced and apply radial pressure in inward radial direction and press together surfaces of the first and second hollow cylindrical workpieces, which surfaces touch each other, at a pressure sufficient to effect a cold pressure weld between the first and second hollow cylindrical workpieces, wherein an axis of rotation of the inner rolling arbor or an axis of rotation of the inner roll forming tool and axes of rotation of the two diametrically opposed outer roll forming tools are arranged parallel to each other, respectively, for axial roll forming.

2. The method according to claim 1, wherein the radial play relative to one another is such that the first and second hollow cylindrical workpieces can barely be inserted by hand.

3. The method according to claim 1, wherein the first and second hollow cylindrical workpieces are rings.

4. The method according to claim 1, wherein the first and second hollow cylindrical workpieces are pipes.

5. The method according to claim 1, wherein at least one of the surfaces that touch each other is coated with an aluminum layer promoting the connection of the first and second hollow cylindrical workpieces during rolling.

6. The method according to claim 1, wherein an aluminum layer is positioned between the first and second hollow cylindrical workpieces for weight reduction of the composite workpiece.

7. An annular composite workpiece produced according to the method of claim 1.

8. The composite workpiece according to claim 7, wherein the composite workpiece is a bearing ring.

9. The composite workpiece according to claim 8, wherein the first hollow cylindrical workpieces forming a bearing race of the bearing ring is made of antifriction bearing steel and wherein the second hollow cylindrical workpieces forming a support ring of the bearing ring is made of a steel having a reduced quality compared to the antifriction bearing steel.

10. The composite workpiece according to claim 7, wherein the composite workpiece is a gear ring.

11. The composite workpiece according to claim 7, wherein the first or the second hollow cylindrical workpiece is comprised of a nonferrous metal.

12. The composite workpiece according to claim 11, wherein the nonferrous material is aluminum.

13. The composite workpiece according to claim 7, wherein the first or the second hollow cylindrical workpiece is made of plastic material.

14. The composite workpiece according to claim 7, wherein the first or the second hollow cylindrical workpiece is made of powder material.

15. The method according to claim 1, wherein between the first and second hollow cylindrical workpieces a cold pressure welding connection is produced.

16. A cold rolling method for producing an annular composite workpiece, the method comprising the steps of:

inserting a first hollow cylindrical workpiece into a second hollow cylindrical workpiece, wherein the first and second hollow cylindrical workpieces have radial play relative to one another when inserted into one another and are made of different materials;

axial roll forming a composite workpiece of the first and second hollow cylindrical workpieces by pressing the first and second hollow cylindrical workpieces against each other between two diametrically opposed rotating outer roll forming tools and a rotating inner roll forming tool, wherein the inner roll forming tool is profiled to produce an inner profile on the composite workpiece, wherein the inner roll forming tool is radially advanced and applies radial pressure in outward radial direction and the two diametrically opposed outer roll forming tools are radially advanced and apply radial pressure in inward radial direction and press together surfaces of the first and second hollow cylindrical workpieces, which surfaces touch each other, at a pressure sufficient to effect a cold pressure weld of the first and second hollow cylindrical workpieces, wherein an axis of rotation of the inner roll forming tool and axes of rotation of the two diametrically opposed outer roll forming tools are arranged parallel to each other, respectively, for axial roll forming.

\* \* \* \* \*